Aug. 8, 1939.        L. B. WINTON         2,168,380
CONTAINER FILLING APPARATUS
Filed Oct. 7, 1937          2 Sheets-Sheet 1
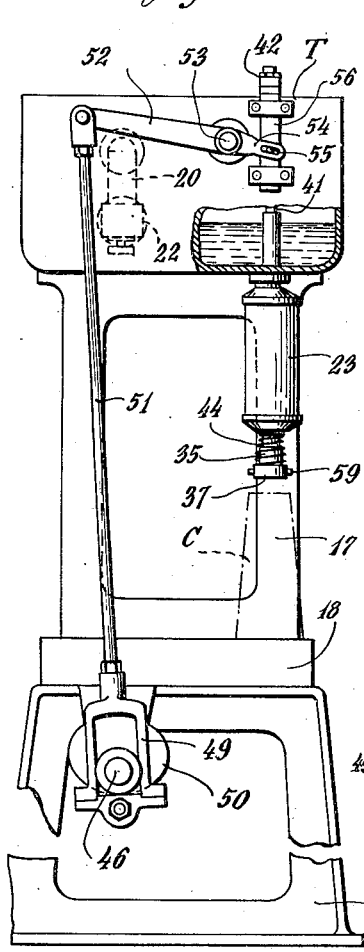
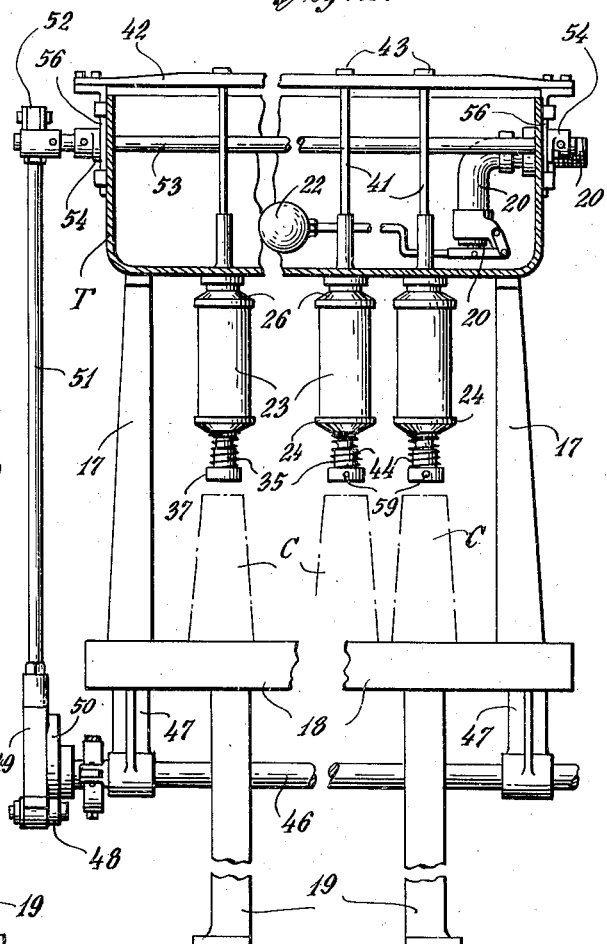
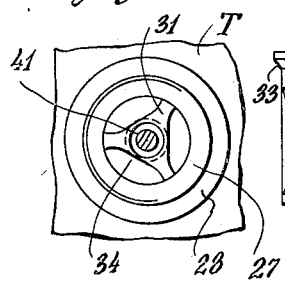
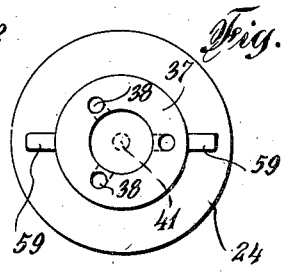
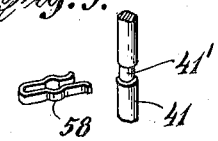
INVENTOR
L. B. Winton
BY John O. Seifert
ATTORNEY

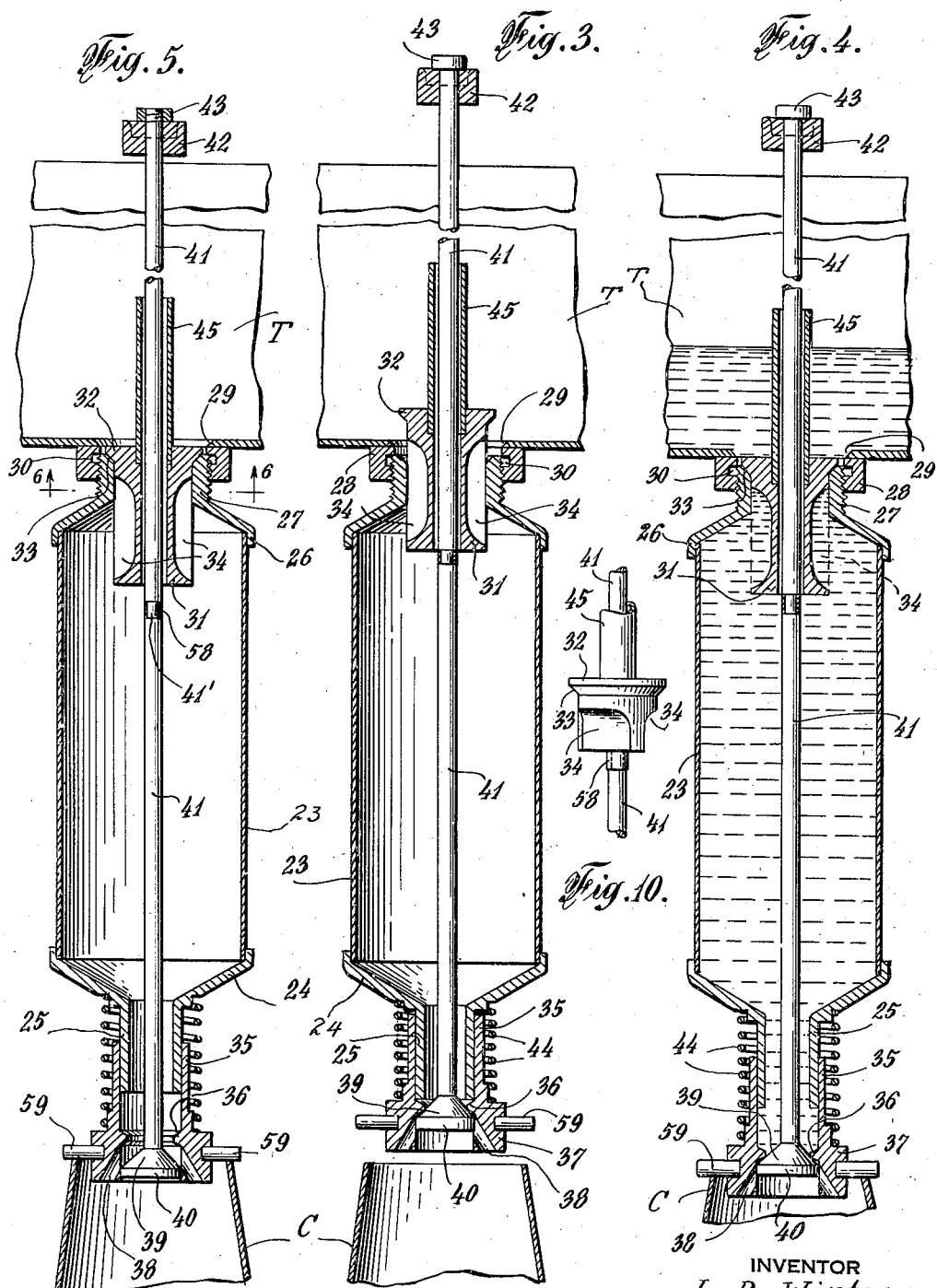

Patented Aug. 8, 1939

2,168,380

UNITED STATES PATENT OFFICE 2,168,380

CONTAINER FILLING APPARATUS

Lewis B. Winton, Greenwich, Conn., assignor to American Sealcone Corporation, New York, N. Y., a corporation of New York Application October 7, 1937, Serial No. 167,720

8 Claims. (Cl. 226—108)

This invention relates to apparatus for filling liquid, particularly milk, buttermilk or cream, in successive measured quantities from a tank into containers and including a tank containing the liquid and a measuring device or devices comprising a receptacle having an inlet for the liquid adapted for connecting the receptacle in communication with the tank and an outlet, and valve means to control the opening and shutting off of communication between the inlet of the measuring device and the tank and the opening and closing of the outlet to discharge the liquid from the measuring device and operative to close the outlet and open the inlet to the tank to fill liquid into the measuring device from the tank, or close the inlet and open the outlet to discharge the liquid from the measuring device.

It is an object of the invention to provide improved valve mechanism for controlling the inlet and discharge outlet of the measuring device to fill liquid into and discharge liquid from the measuring device and normally closing the discharge outlet, and means operative to alternately open and shut off the inlet of the measuring device from the tank and operative in conjunction with a container into which the liquid is to be filled to open the outlet to discharge the liquid from the measuring device into the container.

In container filling apparatus of this character utilizing a measuring device to deliver the liquid from a tank, particularly in filling milk into containers, due to air in the measuring device as the milk is filled into the measuring device it mixes with the air and creates bubbles which tend to displace some of the milk at the top of the measuring device with the result that an accurately predetermined measuring quantity of milk is not discharged. It is a further object of the invention to provide in apparatus of this character a measuring device of indefinite capacity but greater than the predetermined quantity to be filled into a container, and to provide the measuring device with means, preferably connected in communication with the tank above the level of the milk therein, for the outlet of air from the measuring device displaced by milk filled therein and the admission of air into the measuring device to displace milk discharged therefrom, and also adapted to eject milk from the measuring device greater than a predetermined quantity and assuring the delivering of milk from the tank in predetermined measured quantities.

In apparatus of this character utilized for filling milk, buttermilk and cream into containers should the measuring device be of a capacity to measure and deliver a predetermined quantity of milk it will not be of sufficient capacity to deliver the same predetermined quantity of buttermilk or cream due to the greater viscosity of buttermilk and cream than milk and the adhering thereof to the side wall of the measuring device.

It is another object of the invention to provide in container filling apparatus a measuring device which is of indefinite capacity but of a capacity greater than the desired predetermined quantity of liquid to be filled into a container, and the provision of means operative after the liquid has been filled into the measuring device to displace or eject liquid from the measuring device greater than the desired predetermined quantity to be filled into a container and thus adapt the measuring device to measure and deliver the same quantity of milk as of buttermilk or cream, and which means is operative simultaneously with the closing and shutting off of the inlet to the measuring device from the tank and prior to opening the outlet of the measuring device to discharge the contents therefrom.

It is another object of the invention to provide in container filling apparatus of this character valve mechanism to control the opening and closing of the inlet and connection of the measuring device with the tank to displace or eject from the measuring device all of the liquid greater than the predetermined quantity to be filled into a container and return the same to the tank.

It is another object of the invention to provide in container filling apparatus of this character improved valve mechanism to control the opening and closing of the inlet and connection of the measuring device with the tank and operative to displace or eject from the measuring device liquid greater than the predetermined quantity to be filled into a container and return the same to the tank, and also arrange said valve mechanism to permit of the outlet of air from the measuring device displaced by the liquid filled therein and admit air into the measuring device to displace liquid discharged therefrom.

Other objects and advantages of the invention will hereinafter appear.

In the drawings accompanying and forming a part of this application, Figure 1 is a side elevation, partly in section, of container filling apparatus illustrating an embodiment of the invention.

Figure 2 is a front elevation looking at the right of Figure 1 with the liquid containing tank in section to show the arrangement of the parts therein.

Figure 3 is a longitudinal sectional view of a liquid measuring and discharging means showing the parts in position to fill liquid into the measuring device.

Figure 4 is a view similar to Figure 3, but showing the positions the parts assume after the measuring device has been filled with liquid from the tank and preparatory to discharging and filling the same into a container.

Figure 5 is a view similar to Figures 3 and 4 and showing the parts in position to discharge the liquid from the measuring device into a container positioned relative to the outlet thereof.

Figure 6 is a cross sectional view taken substantially on the line 6—6 of Figure 5 looking in the direction of the arrows.

Figure 7 is a side elevation of the valve shown in Figures 3 to 5 for controlling the connection of the inlet to the measuring device with the tank.

Figure 8 is a view looking at the bottom or outlet end of the measuring device.

Figure 9 is a detail view in perspective and dissembled of the parts for coupling and uncoupling the inlet control valve for the measuring device with its actuating means.

Figure 10 is a side elevation of a modified form of valve for controlling the connection of the inlet to the measuring device with the tank.

In carrying out the embodiment of the invention illustrated in the drawings, a tank T to contain the material to be filled into containers, in the present instance milk, butter milk and cream for which the apparatus is particularly adapted, is supported at the opposite ends by standards 17 mounted upon a table 18 supported by standards 19 and upon which table containers C to be filled are supported relative to the outlet of the measuring and discharge means. The tank has material inlet means adapted for connection with a source of supply, as at 20, controlled by a valve 21 actuated by a float 22 in the tank to maintain the material at a predetermined level in the tank.

To discharge the material from the tank in predetermined quantities and fill the same into a container or containers, there is provided a measuring device, although in practice the tank is provided with a series of measuring devices, usually six in number and only three of which are shown, each measuring device comprising a receptacle in the form of a cup member and in the embodiment shown including a cylindrical body 23 having a bottom 24 at one end arranged with a tubular projecting outlet portion 25 co-axially of the body, and the opposite end having a head 26 secured thereto arranged with a tubular projecting inlet portion 27 externally screw threaded for releasable connection to an internally threaded collar 28 secured, as by welding or otherwise, to the bottom of the tank in register with an opening 29 and having an annular recess 30 for a suitable packing material to seal the connection of the measuring device with the opening in the bottom of the tank. Valve mechanism is provided for controlling the connection between and filling of liquid from the tank into the measuring device and the discharge of the liquid from the outlet of the measuring device controlled by a container supported on the table 18 in alinement with the outlet of the measuring device and into which container liquid is to be filled. For this purpose a valve, in the form of a circular elongated plug 31, is slidably engaged in the inlet opening in the head 26. While the outer cylindrical portion of the valve plug in slidable engagement with the wall of the bore in the tubular projecting portion 27 of the head 26 of the measuring device serves to close and shut off the inlet to the measuring device from the tank, the valve plug may be arranged with an annular enlargement 32 at the end having the under surface beveled to constitute a seat to engage by gravity a correspondingly formed seat about the opening in the tubular inlet portion 27, as shown at 33 in Figures 4 and 5. The valve plug is provided with a series of longitudinal recesses 34 spaced about the same, shown as three in number, adapted to open communication between the tank and measuring device when the valve is moved away from the seat 33, as shown in Figure 3.

A nozzle in the form of a sleeve 35 is slidably mounted on the tubular outlet portion 25, said sleeve having an internal annular rib 36 inward from the outer end and at the juncture of a portion 37 of the sleeve of increased thickness with discharge orifices 38 diverging from the rib 36 through said thickened wall portion. The discharge orifices are shut off from the discharge outlet and the discharge outlet closed by a valve 39 seating against a seat on the outer side of the rib 36, the valve having a cylindrical portion 40 outward from the seat to shut off the nozzle outward from the orifices and direct the material through the orifices when the valve is moved to outlet opening position. The valve 39 is carried and actuated by a stem 41 extended through the measuring device and a bore in the valve plug 31 of greater diameter than the valve stem to provide a space between the wall of the bore and valve stem and is extended through an opening in and supported by an actuator bar 42 by a head, in the form of a nut 43, threaded onto the end of the stem. The nozzle is normally urged in a direction to engage the rib 36 with the valve 39 to shut off the discharge orifices from the measuring device by a spring 44 coiled about the nozzle sleeve and confined between the shoulder formed by the portion of increased diameter 37 of the nozzle and the bottom 24 of the measuring device.

To effect an accurate measuring of the material discharged and to expel the air from the cup member 23 as liquid is filled therein to prevent the creation of bubbles and foam, and the admission of air to said cup member to displace the liquid discharged therefrom, the cup member of the measuring device is at all times maintained in communication with the space above the level of the liquid in the tank by providing the valve plug 31 with a co-axial tubular portion 45, the bore of which is equal in diameter to the bore through the valve plug and larger than the diameter of the valve stem 41 to provide a passage between said tubular portion and valve stem in communication with the cup 23 through the bore in the valve plug. While this tubular portion is shown as a tube secured in the end of the plug valve, it may constitute an integral portion thereof.

The valve mechanism to control the filling of material from the tank into the measuring device and the discharge of the material from the measuring device, is actuated from a drive shaft 46, shown as journaled in hangers 47 suspended from the table 18, by a roller 48 mounted on a bifurcated carried 49 straddling the shaft and following a cam 50 fixed on the shaft. The roller carrier is connected by a rod 51 to an arm 52 fixed to the end of a rock shaft 53 exterior of the tank T, the shaft 53 extending transversely of and journalled in the opposite end walls of the tank. The movement of the shaft is transmitted through the actuator bar 42 as a straight line movement to the valve stem or stems 41 by arms 54 fixed to the shaft 53 exterior of the tank having a pin and slot connection 55 with supports 56 mounted on the tank to have vertical sliding movement in the plane of the valve stem or stems and to which the actuator bar 42 is fixed.

The normal position of the valve mechanism is as shown in Figure 4 with the seat 36 of the nozzle seated against the valve 39 shutting off the discharge outlet from the measuring device and the valve plug 31 seated against the seat 33 closing the inlet to the measuring device and shutting off the flow of the material from the tank to the measuring device. During the initial movement of the valve 39, the nozzle 35 is moved against the tension of spring 44, and during this movement the plug valve 31 is coupled with the stem 41 and moved to open the inlet to the measuring device to the tank by a U-shaped resilient pin 58 engaging a seat in a transverse recess 41' in the valve stem 41 (Figure 9) below the plug valve and moving the valve plug from its seat and opening the measuring device to the tank through the longitudinal recesses 34 in the valve, as shown in Figure 3. In successive sequence with the flow of the material into the measuring device, retrograde movement is imparted to the valve stem 41 to move the valve 39 in a direction outward from the nozzle 35, the nozzle being urged outward to participate in this movement of the valve by the spring 44. During this movement of the valve stem the plug valve moves to closing position by gravity, the valve stem assuming a position substantially as shown in Figure 4. Further movement is then imparted to the valve 39 outward from the nozzle to a predetermined extent, but not sufficient to permit the nozzle sleeve to move off from the projecting outlet portion 25, and should there be no container at the discharge outlet of the measuring device into which to fill the material therefrom, the valve seat 36 is seated against the valve 39 and preventing the discharge of the material from the measuring device. However, should there be a container at the discharge outlet, the nozzle will partly engage therein until pins 59 fixed in and extending diametrically opposite from the nozzle engage the top edge of the container C, as shown in Figure 5, when the continued movement of the valve 39 outward from the nozzle will move away from the seat 36 and open the nozzle orifices 38 to the projecting outlet portion 25 and discharge of the material into the container. By the engagement of the circular portion 40 of the valve with the nozzle bore outward from the nozzle orifices, the face of the valve being of conical form, the valve directs and permits of the discharge of the material only through the nozzle orifices. The measuring device is adapted to contain a quantity of material greater than a predetermined unit of measurement and of a capacity greater than the capacity of the container into which the liquid is filled. In practice the measuring device 23 has an indefinite capacity and greater than the desired predetermined quantity to be measured and discharged from the tank into a container. In the measuring and discharge of successive predetermined quantities of butter milk or cream, or other liquid having substantially the same viscosity, such as oil, there is utilized an inlet control valve as shown in Figure 10. Should it be desired to utilize the measuring device for measuring and filling the same predetermined quantity of milk into containers, which has a less viscosity than butter milk or cream, the inlet control valve 31 is of increased length or size so that the valve in the inlet closing position thereof will extend into the measuring device, as shown in Figures 3, 4, 5 and 7, the valve displacing and ejecting a quantity of milk from the measuring device equal to the cubical volume of such portion of increased length of the valve extended into the measuring device and milk in quantity greater than the desired quantity will be ejected from the top of the tubular projection 45 of the valve into the tank.

While the means for displacing liquid from the measuring device when utilized for measuring and filling milk into containers to effect accurate measuring is shown as combined with the inlet control valve, and the means to connect the measuring device with the tank above the level of the liquid therein is shown as a bore through the valve plug 31 and the tubular portion 45, this connection of the measuring device with the tank above the level of the liquid therein may be independent of the inlet control valve 31.

Having described my invention, I claim:

1. In container filling means, a liquid carrying tank having an outlet, means to discharge the liquid from the tank in successive predetermined measured quantities from the tank, comprising a measuring device including a receptacle of a capacity in excess of the predetermined quantity to be discharged thereby from the tank having an outlet and an inlet in communication with the tank outlet, means to maintain the top of the receptacle in communication with the tank above the level of the liquid therein, valve means movable toward and away from the outlet of the receptacle to control the discharge of liquid from the receptacle, and a valve to control the receptacle inlet adapted to assume inlet closing position by and prior to the movement of the outlet valve means to outlet opening position and to be actuated to inlet opening position by and in successive sequence to the movement of the outlet valve means to outlet closing position, and said inlet valve arranged and operative prior to the actuation of the outlet valve means to outlet opening position to eject through the communication of the receptacle with the tank above the level of the liquid therein a quantity of liquid filled from the tank into the receptacle equal to the excess of the desired predetermined quantity to be discharged from the tank and effect discharge of an accurately measured quantity of liquid from the tank.

2. In container filling means, a liquid carrying tank, a measuring device comprising a receptacle having an inlet opening to the bottom of the tank and an outlet, a valve to control the inlet to the receptacle adapted to assume inlet closing position, means to control the outlet and discharge of liquid from the receptacle including a stem extended through the receptacle and inlet control valve and slidable relative to said valve and carrying a valve head exterior of the receptacle movable by the stem toward and away from the outlet and a sleeve slidably supported concentrically of the valve stem to have movement relative to the outlet arranged with an internal annular valve seat and urged outwardly from the outlet to engage the valve seat with the valve head to close the receptacle outlet and cause the sleeve to participate in the movement of the valve toward and away from the receptacle outlet, and means carried by the valve stem to cause the inlet control valve to participate in the movement of the stem at a predetermined point in the outlet closing movement of the outlet control valve and effect movement of the inlet control valve to inlet opening position and permit movement of the inlet control valve to inlet closing position by the movement of the stem of the outlet control valve to move the valve head away from the outlet, and said sleeve adapted to be engaged by a container into which the liquid is to be filled by the movement of the valve head away from the outlet and arrest the movement of the sleeve with the valve and permit the valve head to be moved away from the valve seat of the sleeve and open the outlet to discharge the liquid from the receptacle into the container.

3. In container filling apparatus, a liquid carrying tank having an outlet opening in the bottom, a measuring device connected at one end to the bottom of the tank having a valve controlled inlet in the end connected to the tank in communication with the outlet opening therein and an outlet from a tubular portion projecting from the measuring device, a nozzle slidably mounted on said projecting portion in communication with the outlet of the measuring device and arranged with an annular valve seat within the outlet, a valve closing inwardly and opening outwardly from said valve seat of the nozzle to control the connecting of the nozzle with the outlet of the measuring device, a spring normally urging the nozzle in a direction to engage the valve seat with the valve and close the nozzle outlet, and means to impart movement to the valve toward and engage the valve with the valve seat of the nozzle to close the outlet of the measuring device and outwardly from the valve seat, and said nozzle arranged with means to engage a container supported relative to the outlet to arrest the outward movement thereof with the valve and permit movement of the valve away from the valve seat to discharge the liquid from the measuring device.

4. In container filling means, a liquid carrying tank having a float controlled valve connection with a liquid supply to maintain the liquid substantially at a predetermined level in the tank and an outlet opening in the bottom, and means to discharge the liquid from the tank in predetermined measured quantities comprising a receptacle of a capacity greater than the predetermined quantity to be discharged from the tank having a material inlet in communication with the outlet opening of the tank and an outlet, a valve for the receptacle inlet assuming inlet closing position and arranged to maintain the receptacle in communication with the tank above the level of the liquid therein in all positions of the valve for the outlet of air from and admission of air into the receptacle, valve means to control the outlet normally urged to outlet closing position, means to actuate the outlet valve means relative to the outlet toward and away from the receptacle and effect actuation of the inlet valve to inlet opening position by the movement of the outlet valve means toward the receptacle and permit the inlet valve to assume inlet closing position by the movement of the outlet valve means away from the receptacle, and the actuation of said outlet valve means to open the outlet of the receptacle controlled by a container into which the liquid is to be filled when said actuating means effects actuation of the outlet valve means away from the receptacle.

5. In container filling means, a liquid carrying tank, a receptacle of predetermined capacity having an inlet in communication with the bottom of the tank and an outlet through a tubular outwardly projecting portion, a valve to control the receptacle inlet and communication of the receptacle with the tank normally assuming inlet closing position by gravity having a portion projecting above the level of the liquid in the tank and an opening therethrough to maintain the receptacle in communication with the tank above the level of the liquid therein, and valve means to control the discharge of liquid from the outlet of the receptacle including a nozzle comprising a tubular member slidably engaged upon the tubular outlet projection having an annular internal seat intermediate the ends and ports diverging outwardly from said seat and outwardly extending projections, and a valve head slidably engaged in the tubular nozzle member outwardly of the seat and adapted to be engaged by the seat and having a stem extending through the receptacle and inlet valve, a spring to urge the tubular nozzle member outwardly to engage the seat with the valve, and means connected to the valve stem operative to transmit limited movement to the valve and tubular nozzle member toward and away from the receptacle, and the stem arranged with means to engage and move the inlet valve to inlet opening position by the movement of the outlet valve means toward the receptacle and permit the inlet valve to assume inlet closing position by gravity by the movement of the outlet valve means away from the receptacle, and the lateral projections of the nozzle adapted to engage a container into which the liquid is to be filled by the movement of the outlet valve means away from the receptacle and arrest the movement of the nozzle and permit movement of the valve head away from the nozzle seat and open the outlet of the receptacle to discharge the liquid therefrom into the container.

6. In container filling means, a liquid carrying tank, a receptacle of predetermined capacity having an inlet in communication with the bottom of the tank and an outlet, a valve to control the inlet and connection of the receptacle with the tank normally assuming inlet closing position, valve means for the outlet including a valve head movable in a direction toward and away from the outlet and a tubular nozzle in communication with and slidable relative to the receptacle outlet arranged with a valve seat and urged in a direction to engage the valve seat with the valve head to shut off the nozzle outlet from the receptacle outlet and cause the nozzle to participate in the movements of the valve head, said valve outlet means during the movement thereof toward the receptacle outlet adapted to move the inlet valve to inlet opening position and during the movement of the outlet valve means away from the receptacle outlet permit the inlet valve to assume inlet closing position, and said nozzle by the movement of the outlet means away from the outlet adapted to be engaged with a receptacle into which the liquid is to be filled from the receptacle and arrest the movement of the nozzle and permit the valve head to move away from the valve seat of the nozzle to open the nozzle to the receptacle outlet and discharge of the liquid from the receptacle into the container.

7. Container filling means as claimed in claim 6, wherein the control valve for the inlet of the receptacle is arranged to maintain the receptacle in communication with the tank above the level of the liquid therein and displace a predetermined quantity of liquid from the receptacle and discharge the same into the tank through said connection of the receptacle with the tank to effect measuring and discharge of a predetermined quantity of liquid from the tank.

8. In container filling means, a liquid carrying tank having an outlet opening in the bottom, a measuring device comprising a receptacle of predetermined capacity having an inlet arranged with a valve seat axially at one end of the receptacle and connected to the tank to extend downwardly therefrom with the inlet in communication with the outlet opening of the tank and having an outlet through a tubular portion projecting from the opposite end in alinement with the inlet, a valve for controlling the connection of the inlet of the measuring device with the tank in normal position adapted to be seated by gravity against the valve seat to shut off the inlet from the container and having an axial tubular portion at all times open to the tank above the level of the liquid therein and the measuring device for the outlet of air from and admission of air into the measuring device and the valve arranged to displace liquid from the measuring device as the valve moves to inlet closing position and eject the displaced liquid through said tubular portion to effect accurate measuring of the liquid delivered by the measuring device, a nozzle slidably mounted on the tubular outlet portion through which the liquid is discharged from the measuring device and arranged with an internal annular valve seat, a valve closing inwardly and opening outwardly from the nozzle adapted to control the connection of the nozzle with the outlet of the measuring device and discharge of the liquid from the measuring device and having a stem extended through the inlet control valve arranged with means to couple said inlet valve to the stem and actuate the inlet valve to inlet opening position by the movement of the outlet valve toward the nozzle and uncouple the inlet valve from said stem when the outlet valve is moved to outlet opening position and permit the inlet valve to assume inlet closing position, and a spring to urge the nozzle outwardly from the measuring device to engage the valve seat thereof with the valve and cause the nozzle to participate in the movement of the outlet valve, and the nozzle arranged with means to engage a container supported relative to the outlet to arrest the movement thereof outward with the valve and permit movement of the valve from the valve seat of the nozzle and open the nozzle to the outlet of the measuring device and discharge of the contents of the measuring device into the container.

LEWIS B. WINTON.